Nov. 4, 1924.

L. W. THOMPSON

REGULATING SYSTEM

Filed Feb. 10, 1923

1,514,576

Inventor:
Louis W. Thompson,
by
His Attorney.

Patented Nov. 4, 1924.

1,514,576

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

REGULATING SYSTEM.

Application filed February 10, 1923. Serial No. 618,220.

*To all whom it may concern:*

Be it known that I, LOUIS W. THOMPSON, a citizen of the United States, residing at Schenectady, county of Schenectady, State of New York, have invented certain new and useful Improvements in Regulating Systems, of which the following is a specification.

My invention relates to regulating systems and particularly to systems in which a very close regulation is required and one object of my invention is to provide a new, simple and improved arrangement whereby such regulations may be obtained. In accordance with my invention I provide an alternating current generator which is arranged to be driven so that its speed varies in accordance with the variations of the condition to be regulated, and which is arranged to supply a current out of phase with the generated voltage so that the armature reaction controls the excitation of the generator. Preferably the armature current leads the generated voltage so that the armature reaction excites the generator. A suitable electroresponsive device is connected so that it operates in accordance with the voltage of the generator to control the regulation of the condition to be regulated.

Another object of my invention is to provide a new and improved speed regulating system whereby the speed of a device may be maintained contant over a very wide range and the necessary operations to change from one constant speed to another may be easily and quickly made.

My invention will be better understood from the following description taken in connection with the accompanying drawing and its scope will be pointed out in the appended claims.

Figure 1:
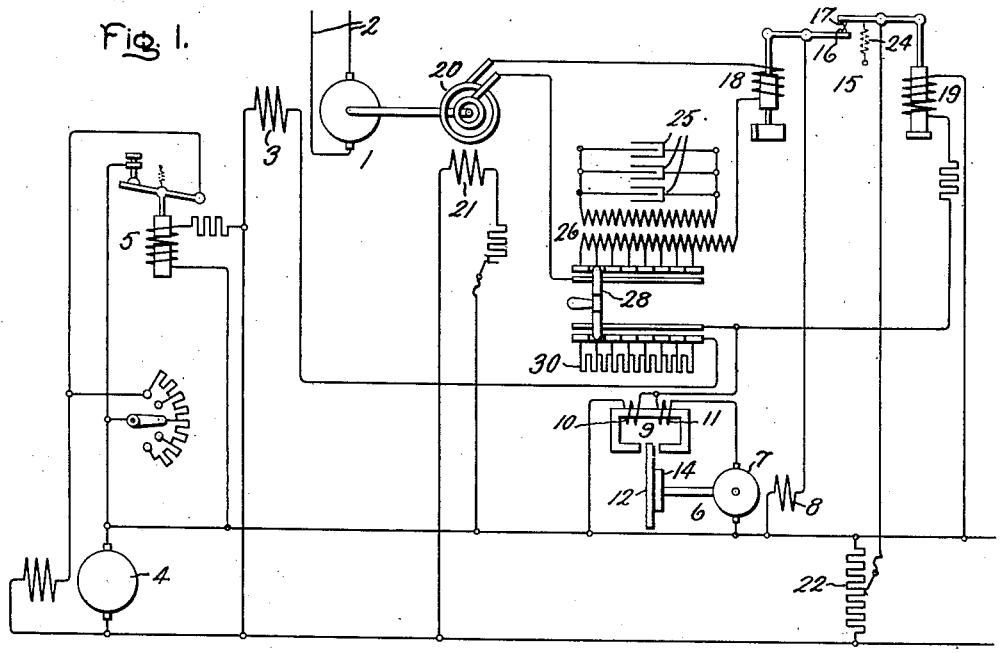
Figure 2:
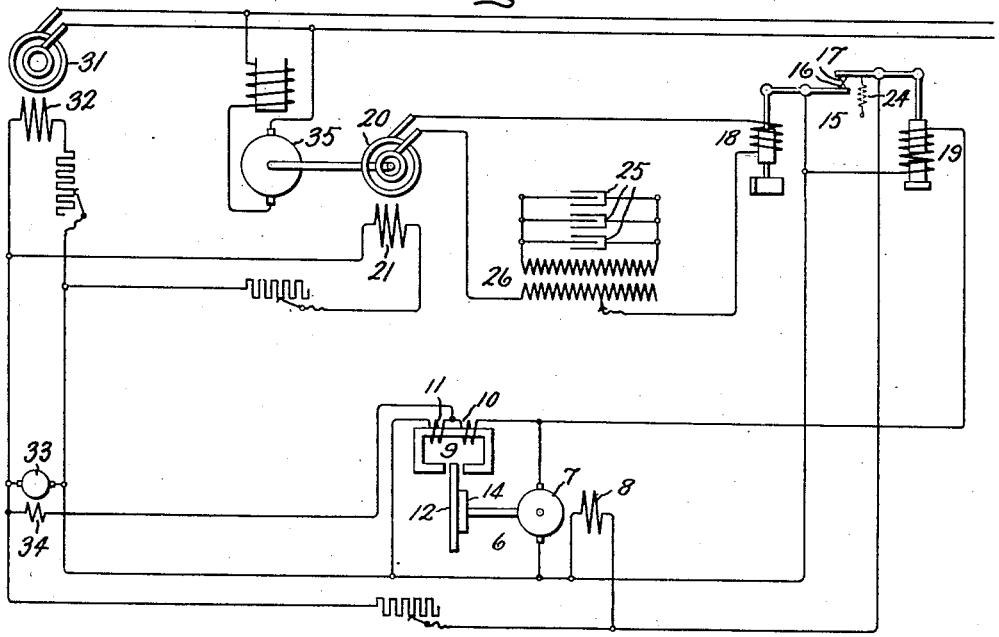

In the accompanying drawing Fig. 1 is a diagram of a speed regulating system for an electric motor embodying my invention and Fig. 2 is a diagram of a voltage regulating system embodying my invention.

1 represents a direct current motor, the speed of which is to be maintained constant. The armature winding of the motor may be supplied with current from any suitable source of direct current such as the direct current supply circuit 2. The motor is provided with a field winding 3, which may be supplied with current from any suitable source shown as an exciter 4, the voltage of which is maintained constant by means of a vibratory regulator 5 of the well known Tirrill type.

The speed of the motor 1 is maintained constant by varying the excitation of the motor. The particular arrangement shown for controlling the excitation is similar to the regulating arrangement shown in my prior Patent No. 1,365,566 which is assigned to the same assignee as this application. This arrangement comprises a motor 6 which controls by its counter electromotive force the excitation of the main motor 1. The motor 6 is provided with an armature winding 7, which is connected in series with the field winding 3 of the main motor 1, and with a field winding 8. The speed of the motor 6 is controlled by means of a brake of the magnetic drag type comprising a core 9 around which two coils 10 and 11 are wound and between the poles of which is located an armature 12 consisting of a disc of conducting material which is connected to rotate with the armature 7 of the motor 6. The coil 10 is connected in parallel with the armature 7 and the coil 11 is connected in series with the armature 7 so that the counter-torque of the brake increases with the counter electromotive force of the motor 6 and with the excitation of the motor 1. Therefore the counter torque of the brake varies with the torque of the motor 6, so as to limit the speed range of the motor. 14 represents a fly wheel connected to rotate with the armature 7 of the motor 6 for a purpose well known in the art.

The regulating effect of the motor 6 is controlled by the vibratory regulator 15, which is of the well known Tirrill type. As shown the vibratory device comprises two floating contacts 16 and 17 controlled by the relays 18 and 19 respectively. The coil of the relay 19 is connected across the terminals of the armature 7 of the motor 6 and acts as the anti-hunting coil of the regulator to maintain the contact 17 in rapid vibration. The coil of the relay 18 is connected to the armature winding of an alternating current generator 20 which is driven by the motor 1 in any suitable manner so that its speed is proportional to the speed of the motor. The generator 20 is provided with a field winding 21 which may be connected to any suitable source of current such as the exciter 4. The contacts 16 and 17 of the vibratory device 15 are connected in series with the field winding 8 of the motor 6, so that the excitation of the motor is controlled by the relative positions of the contacts 16 and 17. The field winding 8 may be connected to any suitable source of current such as across a portion of the resistor 22 which is connected across the terminals of the exciter 4. In this manner, any suitable voltage may be impressed across the field winding 8 when the contacts 16 and 17 are closed. The contact 17 is biased toward the contact 16 by a spring 24 so that when the relay 19 is deenergized the contact 17 is moved into engagement with the contact 16 to increase the counter electromotive force of the motor 6. A suitable capacity reactance such as the static condensers 25, is connected to the generator in any suitable manner, as by means of the step up transformer 26, so that the power factor of the total load supplied by the generator is leading, that is, the armature current leads the generated voltage. It is well known that when an alternating current generator supplies a leading current, the armature reaction due to this leading current, excites the generator. Therefore the generated voltage depends upon both the excitations of the field winding 21 and the phase and magnitude of the current flowing through the armature winding. As is hereinafter described, this particular characteristic of a generator, whose power factor is leading, causes a great change in the current supplied to the relay 18 when the speed of the motor 1 changes a small amount.

As shown in the drawing, the primary winding of the step up transformer 26 is connected in series with the coil of the relay 18 of the vibratory device 15. The condensers 25 are connected across the secondary winding of the transformer. By using a step up transformer having a high secondary voltage, the number of condensers required to obtain the necessary capacity reactance is small.

In order to vary the speed which is maintained constant, the setting of the relay 18 may be varied by varying the capacity reactance connected in series therewith. This adjustment may be readily made by varying the ratio of transformation of the transformer 26. As shown, this result is obtained by providing the primary winding of the transformer 26 with taps so that a different number of turns may be connected in series with the coil of the relay 18. Also in order to increase the range over which the speed of the motor 1 may be maintained constant with a given counter electromotive force range of the motor 6, an adjustable resistance 30 is connected in the circuit of the field winding 3 and is arranged in any suitable manner so that the resistance 30 and the capacity reactance in the circuit of the relay 18 may be simultaneously adjusted. As shown, any movement of the member 28 simultaneously varies the number of turns of the primary winding of the transformer 26 connected in series with the coil of the relay 18 and the amount of the resistance connected in the circuit of the field winding 3. In this manner, for each setting of the field resistor 30, the speed of the motor is automatically maintained constant at a predetermined value.

The operation of the system shown is as follows: As the speed of the motor 1 increases above its normal value, the frequency of the current supplied by the generator 20 increases so that the capacity reactance connected to the generator decreases, which results in an increase in amount of leading current supplied by the generator. Due to armature reaction, this increase in the amount of leading current through the armature winding of the generator 20 produces an increase in the excitation of the generator, which in turn produces an increase in the voltage of the generator in addition to the increase in voltage due to the increase in speed. Therefore it is evident that there are three factors namely, the speed, frequency and armature reaction of the generator 20, which act accumulatively to increase the current through the coil of the relay 18 so that it varies at a greater rate than the condition being regulated. Consequently a very small change in the speed of the motor 1 produces a great change in the current through the coil of the relay 18. Tests have shown that a 1% change in speed of the motor, produces more than a 10% change in the current through the coil of the relay 18.

The increase in the current through the coil of the relay 18 produced by an increase in the speed of the motor 1 causes the contact 16 to move out of engagement with the contact 17 so that the circuit of the field winding 8 of the motor 6 is opened. The counter electromotive force of the motor 6 therefore decreases so that the current in the field winding of the motor 3 increases and the speed of the motor decreases.

It is evident that if the speed of the motor decreases the changes in speed frequency and armature reaction act accumulatively to decrease current through the coil of the relay 18 so that the contact 16 is moved into engagement with the contact 17, thereby completing the field circuit of the motor 7. The counter electromotive force of the motor therefore, increases so that the current through the field winding 3 of the motor 1 decreases and the speed of the motor 1 increases.

The relay 19 operates in the well known manner to prevent hunting of the motor 1. When the speed of the motor 1 increases and the contacts 16 and 17 are moved out of engagement with each other to decrease the counter electromotive force of the motor 7 so as to increase the excitation of the field winding 3, the voltage across the coil of the relay 19 decreases and the spring 24 moves the contacts 16 and 17 into engagement with each other, thereby decreasing the time that the contacts are out of engagement. In the same manner, when the contacts 16 and 17 are in engagement, the increase in the counter electromotive force of the motor causes the relay 19 more strongly to be energized so that the time the contacts 16 and 17 are in engagement is decreased.

By varying the position of the member 28, the amount of resistance in the field circuit of the motor 1, and the amount of impedance connected in series with the coil 18 are simultaneously varied so that regulator operates to maintain the speed of the motor 1 constant at a new value. For example, if the member 28 is moved toward the left in the drawing, the number of effective primary turns is increased and more of the resistance 30 is connected in series with the field winding 3. By increasing the number of effective primary turns, the impedance connected in series with the coil of the relay 18 is increased so that the motor has to run at a higher speed in order that the generator 20 may develop sufficient voltage to cause the relay 18 to move contact 16 out of engagement with contact 17. By connecting more of the resistance 30 in the circuit of the field winding 3, the field current is decreased so that the motor runs at a faster speed.

By moving the member 28 toward the right the setting of the regulator is changed so that it maintains the speed of the motor constant at a lower value.

It is evident that if the taps on the resistance 30 are so arranged that the field resistance is changed the proper amount to produce the desired change in the motor speed without any change in the operation of the regulator, each time the number of effective primary turns of the transformer 26 is changed the regulator will work over substantially the same range in maintaining all the different speeds of the motor constant.

Referring to Fig. 2 which shows voltage regulating system embodying my invention, 31 represents an alternating current generator the voltage of which is to be regulated. The generator is provided with a field winding 32 connected to an exciter 33 the excitation of which is controlled by means of a voltage regulator of counter electromotive force type which embodies my invention. The regulator per se is similar in construction to the regulator shown in Fig. 1 and comprises a counter electromotive force motor 6 having its armature 7 connected in series with shunt field winding 34 of the exciter, and a field winding 8 connected across the exciter 33 and arranged to be short circuited by the vibratory contacts 16 and 17 of vibratory device 15. The counter electromotive force motor is provided with a magnetic drag brake 9 having energizing windings 10 and 11 connected in series and in shunt respectively with the armature 7. The coil of the control relay 19 of the regulator is connected across the armature 7 of the counter electromotive force motor 6. For controlling the operation of the regulator 15 in response to the voltage of the generator 31, the coil of the control relay 18 is connected to the alternating current generator 20 driven by a motor 35 connected across the generator 31 and having its field winding 21 connected to the exciter 33. The coil of the control relay 18 has connected in series therewith a capacity reactance 26, preferably of the same type disclosed in Fig. 1, so that the armature current of the generator 20 leads the generated voltage. The driving motor 35 is so arranged that variations in the voltage of the generator 31 produce corresponding changes in the speed of the motor. One type of motor which in especially adapted for this purpose is a series motor having a saturated field.

The operation of the regulating system shown in Fig. 2, as far as my invention is concerned is the same as in the system shown in Fig. 1 so that only a brief description of the operation of the entire system is believed to be necessary. As the voltage of the generator 31 varies, the speed of the motor 35 changes so that the speed, voltage, and frequency of the generator change and act accumulatively to change the current through the coil of the control relay 18 of the regulator 15 which in turn operates to control the excitation of the counter electromotive force motor 6 in such a manner as to restore the voltage of the generator 31 to its normal value. For example if the voltage of the generator 31 increases, the motor 35 speeds up so that the current through the coil of the control relay 18 increases. This increase in the energization of the relay 18 opens the contacts 16 and 17 so that the short circuit around the field winding 8 of the counter electromotive force motor 6 is opened. The counter electromotive force of the motor 6 therefore increases so as to decrease the excitation and voltage of the exciter and the excitation and voltage of the generator 31.

It is evident that the generator 20 operates in this system in the same way as in Fig. 1 to magnify the variations of the condition being regulated so that very close regulation of the condition is obtained.

While I have shown and described only two embodiments of my invention, it is evident that my invention is not limited thereto and I seek to cover in the appended claims all those embodiments and modifications of my invention that fall within the true spirit and scope of my invention.

What I claim as new and desire to secure by Letters Patent of the United States, is:

1. In a regulating system, a regulator for controlling the condition to be regulated, an alternating current generator for controlling the operation of said regulator connected and arranged so that the speed of said generator varies in accordance with the condition to be regulated, and means connected to said generator whereby the armature current of said generator is so out of phase with the generated voltage that when speed of the generator changes the armature reaction causes the voltage of the generator to vary at a greater rate.

2. In a regulating system, a regulator for controlling the condition to be regulated, an alternating current generator for controlling the operation of said regulator connected and arranged so that the speed of said generator varies in accordance with the condition to be regulated, and means connected to said generator whereby the armature current of said generator leads the generated voltage.

3. In a regulating system, a regulator for controlling the condition to be regulated, an alternating current generator for controlling the operation of said regulator connected and arranged so that the speed of said generator varies in accordance with the condition to be regulated, and means for causing the armature current of said generator to lead the generated voltage comprising a step-up transformer having its primary winding connected to said generator and a condenser connected to the secondary winding of said transformer.

4. In a regulating system, the combination of an alternating current generator, means for driving said generator at a speed which varies in accordance with the condition to be regulated, means connected to said generator whereby the armature current of said generator leads the generated voltage, and a relay responsive to the voltage of said generator for controlling the condition to be regulated.

5. In a speed regulating system, the combination of an alternating current generator, driving means for said generator, means whereby the speed of said driving means may be regulated, means connected to said generator whereby the armature current of said generator leads the generated voltage, and a relay responsive to the voltage of said generator for controlling said speed regulating means.

6. In a speed regulating system, the combination of an alternating current generator, driving means for said generator, means whereby the speed of said driving means may be regulated, a circuit supplied with current by said generator, capacity reactance connected to said circuit whereby the armature current of said generator leads the generated voltage, and a vibratory relay connected in said circuit and arranged to control said speed regulating means.

7. In a speed regulating system, the combination of an electric motor, an alternating current generator driven by said motor, a circuit supplied with current by said generator, capacity reactance connected to said circuit whereby the armature current of said generator leads the generated voltage, and a vibratory relay connected in said circuit and arranged to control the excitation of said motor.

8. In a speed regulating system, the combination of an electric motor having a field winding, an alternating current generator driven by said motor, a circuit supplied with current by said generator, an adjustable capacity reactance connected in said circuit whereby the armature current of said generator leads the generated voltage, a vibratory relay connected in said circuit and arranged to control the excitation of said motor, and an adjustable resistance in the circuit of the field winding of said motor.

9. In a speed regulating system, the combination of an alternating current generator, driving means for said generator, means whereby the speed of said driving means may be regulated, a relay responsive to the voltage of said generator for controlling said speed regulating means, and means for causing the armature current of said generator to lead the generated voltage comprising a step up transformer having its primary winding connected to said generator, and a condenser connected to the secondary winding of said transformer.

10. In a speed regulating system, the combination of an electric motor, an alternating current generator driven by said motor, a circuit supplied with current by said generator, a vibratory relay connected in said circuit and arranged to control the excitation of said motor, and means for causing the armature current of said generator to lead the generated voltage comprising a step up transformer having its primary winding connected in series with said vibratory relay and a condenser connected to the secondary winding of said transformer.

11. In a speed regulating system, the combination of an electric motor, an alternating current generator driven by said motor, a circuit supplied with current by said generator, a vibratory relay connected in said circuit and arranged to control the excitation of said motor, a capacity reactance comprising a transformer having its primary winding connected in series with said vibratory relay and a condenser connected to the secondary winding of said transformer, an adjustable resistance in the circuit of the field winding of said motor, and means whereby the ratio of transformation of said transformer may be adjusted.

12. In a speed regulating system, the combination of an electric motor having a field winding, an alternating current generator driven by said motor, a circuit supplied with current by said generator a capacity reactance connected in said circuit whereby the armature current of said generator leads the generated voltage, a dynamo electric machine in the circuit of the field winding of said motor, and means for controlling the counter electromotive force of said machine comprising a pair of cooperating contacts, a relay for operating one of said contacts connected so that it is responsive to the current supplied to said circuit by said generator, and a relay for operating the other contact connected so that it is responsive to the counter electromotive force of said machine.

13. In a speed regulating system, the combination of an electric motor having a field winding, an alternating current generator driven by said motor, a circuit supplied with current by said generator, an adjustable capacity reactance connected in said circuit whereby the armature current of said generator leads the generated voltage, a dynamo electric machine in the circuit of the field winding of said motor, and adjustable resistance in the circuit of the field winding of said motor, means whereby said adjustable capacity reactance and said adjustable resistance may be simultaneously adjusted, and means for controlling the counter electromotive force of said machine comprising a pair of cooperating contacts, a relay for operating one of said contacts connected so that it is responsive to the current supplied to said circuit by said generator, and a relay for operating the other contact connected so that it is responsive to the counter electromotive force of said machine.

In witness whereof, I have hereunto set my hand this 8th day of February, 1923.

LOUIS W. THOMPSON.